Feb. 14, 1933.      E. F. HUNT      1,897,196
COMBINATION MACHINE AND WOOD SCREW
Filed Aug. 21, 1929
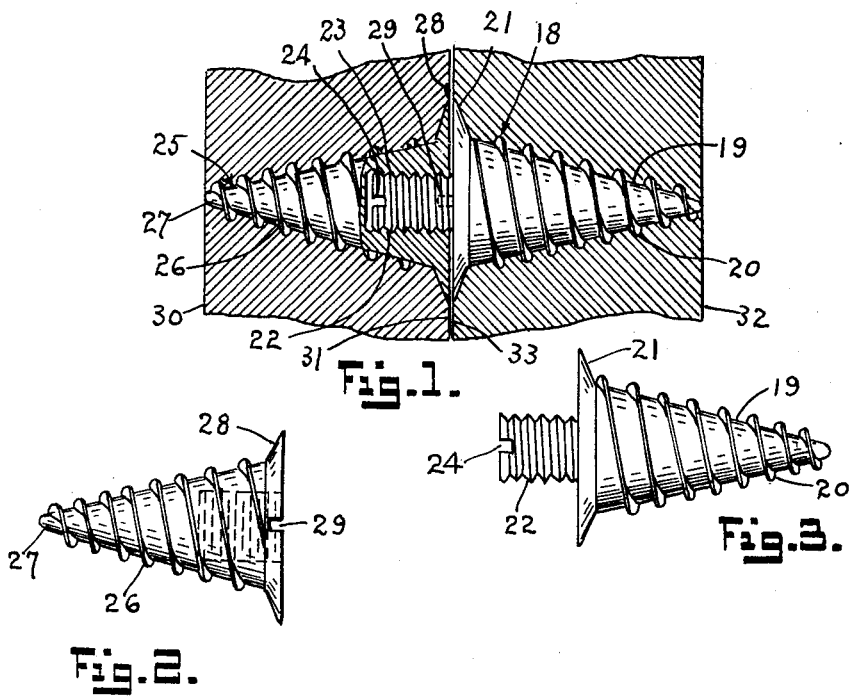
Emma F. Hunt
*INVENTOR.*
BY
Charles A. Clark
*ATTORNEY.*

Patented Feb. 14, 1933

1,897,196

UNITED STATES PATENT OFFICE

EMMA F. HUNT, OF NEW YORK, N. Y.

COMBINATION MACHINE AND WOOD SCREW

Application filed August 21, 1929. Serial No. 387,351.

My invention relates to screws and refers more particular to a combined machine and wood screw.

One object of my invention is to provide a male screw with a tubular shank provided with wood threads and carrying a stud provided with machine threads, and slotted for a screw driver.

Another object of my invention is to provide a female screw having a tubular shank slotted for a screw driver and provided with wood threads and having the interior threaded with machine threads.

A further object of my invention is to provide a male and female screw, both of which are slotted for a screw driver, and provided with straight wood threads, the male having a stud provided with machine threads, and the female having an opening threaded to fit said stud.

A still further object of my invention is to provide a male screw with a tapered shank provided with wood threads and having a stud slotted for a screw driver, and provided with machine threads.

One feature of my invention is to provide a female screw with a tapered shank provided with wood threads and slotted for a screw driver and the interior threaded with machine threads.

Another feature of my invention is to provide a male and female screw slotted for a screw driver, both of which are provided with tapered shanks with wood threads, the male having a stud threaded with machine threads, and slotted for a screw driver, said machine threads adapted to engage with the interior threads of the female screw, which is also slotted for a screw driver.

Still another feature of my invention is to provide a male and female screw, each threaded with wood threads for the purpose of attaching to non-metallic parts, so that when the male is in one part and the female in the other, the two separate parts can be screwed together and firmly held.

It is well known in the art that screws have been made in various shapes and proportions, but none of them incorporate the combination of a wood and machine screw having the same organization of the specific elements utilized in this particular combination.

Figure 1 is a partial section of the male and female screw with tapered shanks shown holding two pieces of wood together.

Figure 2 is a side elevation of the female part of the screw shown in Figure 1.

Figure 3 is a side elevation of the male part of the screw shown in Figure 1.

Referring to Figures 1, 2 and 3, the male part of the screw 18 is provided with a tapered body 19, having screw threads 20, and a head 21, carrying a stud 22, threaded with machine threads 23, and provided with a screw slot 24.

The female part of this screw 25 is provided with a tapered body 26, having wood threads 27, and a head 28, which is slotted at 29, for a screw driver, and the interior of this body is provided with an opening threaded with machine screws adapted to engage with the machine screws 23, on the stud 22 of the male part.

The female 25 is screwed into the wood 30 flush with the surface 31 and the male 18 into the wood 32 flush with the surface 33.

When the material is relatively thick, or the grain of the wood runs parallel to the longitudinal centerline of the screw, the form shown in the figures in order that the wood screw part of the element would have a sufficient holding surface.

Having thus illustrated and described the preferred embodiment of my invention, I do not wish to limit myself to the exact construction or arrangement of parts shown, since it is evident that modifications may be made therein, without departing from the spirit of the invention or scope of the claim.

I claim:—

In a new article of manufacture, the combination of two conventional screws adapted to cooperate with each other in holding two articles firmly and detachably together, both screws having the conventional slotted heads and provided with wood threads, one having a female threaded portion within the screw head and the other a projecting male portion upon its head adapted to engage with said female portion both male and female threaded portions beginning at the flat surface of the conventional screw head.

Signed at New York, county of New York, State of New York, this 17th day of August, 1929.

EMMA F. HUNT.